(12) United States Patent
Kundu et al.

(10) Patent No.: US 11,916,781 B2
(45) Date of Patent: Feb. 27, 2024

(54) SYSTEM AND METHOD FOR FACILITATING EFFICIENT UTILIZATION OF AN OUTPUT BUFFER IN A NETWORK INTERFACE CONTROLLER (NIC)

(71) Applicant: Hewlett Packard Enterprise Development LP, Houston, TX (US)

(72) Inventors: Partha Pratim Kundu, Palo Alto, CA (US); David Charles Hewson, Bristol (GB)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 17/594,624

(22) PCT Filed: Mar. 23, 2020

(86) PCT No.: PCT/US2020/024242
§ 371 (c)(1),
(2) Date: Oct. 25, 2021

(87) PCT Pub. No.: WO2020/236269
PCT Pub. Date: Nov. 26, 2020

(65) Prior Publication Data
US 2022/0255884 A1 Aug. 11, 2022

Related U.S. Application Data

(60) Provisional application No. 62/852,273, filed on May 23, 2019, provisional application No. 62/852,203, (Continued)

(51) Int. Cl.
*H04L 49/9005* (2022.01)
*H04L 49/90* (2022.01)
(Continued)

(52) U.S. Cl.
CPC .............. *H04L 45/28* (2013.01); *G06F 9/505* (2013.01); *G06F 9/546* (2013.01);
(Continued)

(58) Field of Classification Search
None
See application file for complete search history.

(56) References Cited

U.S. PATENT DOCUMENTS

| 4,807,118 A | 2/1989 | Lin et al. |
| 5,138,615 A | 8/1992 | Lamport et al. |

(Continued)

FOREIGN PATENT DOCUMENTS

| CN | 101729609 A | 6/2010 |
| CN | 102932203 A | 2/2013 |

(Continued)

OTHER PUBLICATIONS

International Search Report and Written Opinion received for PCT Application No. PCT/US2020/024242, dated Jul. 6, 2020, 11 pages.
(Continued)

*Primary Examiner* — Steve R Young
(74) *Attorney, Agent, or Firm* — Yao Legal Services, Inc.

(57) ABSTRACT

A network interface controller (NIC) capable of efficiently utilizing an output buffer is provided. The NIC can be equipped with an output buffer, a host interface, an injector logic block, and an allocation logic block. The output buffer can include a plurality of cells, each of which can be a unit of storage in the output buffer. If the host interface receives a command from a host device, the injector logic block can generate a packet based on the command. The allocation logic block can then determine whether the packet is a multi-cell packet. If the packet is a multi-cell packet, the allocation logic block can determine a virtual index for the packet. The allocation logic block can then store, in an entry
(Continued)

in a data structure, the virtual index, and a set of physical indices of cells storing the packet.

20 Claims, 8 Drawing Sheets

Related U.S. Application Data filed on May 23, 2019, provisional application No. 62/852,289, filed on May 23, 2019.

(51) Int. Cl.

| | | |
|---|---|---|
| *H04L 49/9047* | (2022.01) | |
| *G06F 13/40* | (2006.01) | |
| *H04L 45/28* | (2022.01) | |
| *H04L 45/028* | (2022.01) | |
| *H04L 45/125* | (2022.01) | |
| *H04L 45/00* | (2022.01) | |
| *H04L 45/122* | (2022.01) | |
| *H04L 47/76* | (2022.01) | |
| *H04L 49/15* | (2022.01) | |
| *H04L 49/00* | (2022.01) | |
| *H04L 69/40* | (2022.01) | |
| *H04L 47/10* | (2022.01) | |
| *H04L 47/34* | (2022.01) | |
| *H04L 67/1097* | (2022.01) | |
| *G06F 13/16* | (2006.01) | |
| *H04L 45/021* | (2022.01) | |
| *H04L 47/12* | (2022.01) | |
| *G06F 13/42* | (2006.01) | |
| *H04L 47/2441* | (2022.01) | |
| *H04L 47/30* | (2022.01) | |
| *H04L 47/62* | (2022.01) | |
| *H04L 47/24* | (2022.01) | |
| *G06F 13/38* | (2006.01) | |
| *H04L 45/745* | (2022.01) | |
| *H04L 47/2483* | (2022.01) | |
| *H04L 47/629* | (2022.01) | |
| *H04L 47/80* | (2022.01) | |
| *H04L 49/101* | (2022.01) | |
| *H04L 45/12* | (2022.01) | |
| *H04L 47/122* | (2022.01) | |
| *G06F 12/1036* | (2016.01) | |
| *G06F 15/173* | (2006.01) | |
| *H04L 43/10* | (2022.01) | |
| *H04L 45/42* | (2022.01) | |
| *H04L 47/11* | (2022.01) | |
| *G06F 12/0862* | (2016.01) | |
| *G06F 12/1045* | (2016.01) | |
| *H04L 47/32* | (2022.01) | |
| *G06F 9/54* | (2006.01) | |
| *G06F 13/14* | (2006.01) | |
| *G06F 9/50* | (2006.01) | |
| *H04L 47/22* | (2022.01) | |
| *H04L 47/52* | (2022.01) | |
| *H04L 47/6275* | (2022.01) | |
| *H04L 45/24* | (2022.01) | |
| *H04L 45/7453* | (2022.01) | |
| *H04L 45/16* | (2022.01) | |
| *H04L 69/22* | (2022.01) | |
| *H04L 47/762* | (2022.01) | |
| *H04L 47/78* | (2022.01) | |
| *H04L 47/20* | (2022.01) | |
| *H04L 1/00* | (2006.01) | |
| *H04L 43/0876* | (2022.01) | |
| *H04L 47/2466* | (2022.01) | |
| *H04L 47/625* | (2022.01) | |
| *H04L 69/28* | (2022.01) | |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/626* (2013.01); *H04L 47/629* (2013.01); *H04L 47/6235* (2013.01); *H04L 47/6275* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(56) References Cited

U.S. PATENT DOCUMENTS

| | | |
|---|---|---|
| 5,457,687 A | 10/1995 | Newman |
| 5,937,436 A | 8/1999 | Watkins |
| 5,960,178 A | 9/1999 | Cochinwala et al. |
| 5,970,232 A | 10/1999 | Passint et al. |
| 5,983,332 A | 11/1999 | Watkins |
| 6,112,265 A | 8/2000 | Harriman et al. |
| 6,230,252 B1 | 5/2001 | Passint et al. |
| 6,246,682 B1 | 6/2001 | Roy et al. |
| 6,493,347 B2 | 12/2002 | Sindhu et al. |
| 6,545,981 B1 | 4/2003 | Garcia et al. |
| 6,633,580 B1 | 10/2003 | Toerudbakken et al. |
| 6,674,720 B1 | 1/2004 | Passint et al. |
| 6,714,553 B1 | 3/2004 | Poole et al. |
| 6,728,211 B1 | 4/2004 | Peris et al. |
| 6,732,212 B2 | 5/2004 | Sugahara et al. |
| 6,735,173 B1 | 5/2004 | Lenoski et al. |

(56) References Cited

U.S. PATENT DOCUMENTS

| | | |
|---|---|---|
| 6,894,974 B1 | 5/2005 | Aweva et al. |
| 7,023,856 B1 | 4/2006 | Washabaugh et al. |
| 7,133,940 B2 | 11/2006 | Blightman et al. |
| 7,218,637 B1 | 5/2007 | Best et al. |
| 7,269,180 B2 | 9/2007 | Bly et al. |
| 7,305,487 B2 | 12/2007 | Blumrich et al. |
| 7,337,285 B2 | 2/2008 | Tanoue |
| 7,397,797 B2 | 7/2008 | Alfieri et al. |
| 7,430,559 B2 | 9/2008 | Lomet |
| 7,441,006 B2 | 10/2008 | Biran et al. |
| 7,464,174 B1 | 12/2008 | Ngai |
| 7,483,442 B1 | 1/2009 | Torudbakken et al. |
| 7,562,366 B2 | 7/2009 | Pope et al. |
| 7,593,329 B2 | 9/2009 | Kwan et al. |
| 7,596,628 B2 | 9/2009 | Aloni et al. |
| 7,620,791 B1 | 11/2009 | Wentzlaff et al. |
| 7,633,869 B1 | 12/2009 | Morris et al. |
| 7,639,616 B1 | 12/2009 | Manula et al. |
| 7,734,894 B1 | 6/2010 | Wentzlaff et al. |
| 7,774,461 B2 | 8/2010 | Tanaka et al. |
| 7,782,869 B1 | 8/2010 | Chitlur Srinivasa |
| 7,796,579 B2 | 9/2010 | Bruss |
| 7,856,026 B1 | 12/2010 | Finan et al. |
| 7,933,282 B1 | 4/2011 | Gupta et al. |
| 7,953,002 B2 | 5/2011 | Opsasnick |
| 7,975,120 B2 | 7/2011 | Sabbatini, Jr. et al. |
| 8,014,278 B1 | 9/2011 | Subramanian et al. |
| 8,023,521 B2 | 9/2011 | Woo et al. |
| 8,050,180 B2 | 11/2011 | Judd |
| 8,077,606 B1 | 12/2011 | Litwack |
| 8,103,788 B1 | 1/2012 | Miranda |
| 8,160,085 B2 | 4/2012 | Voruganti et al. |
| 8,175,107 B1 | 5/2012 | Yalagandula et al. |
| 8,249,072 B2 | 8/2012 | Sugumar et al. |
| 8,281,013 B2 | 10/2012 | Mundkur et al. |
| 8,352,727 B2 | 1/2013 | Chen et al. |
| 8,353,003 B2 | 1/2013 | Noehring et al. |
| 8,443,151 B2 | 5/2013 | Tang et al. |
| 8,473,783 B2 | 6/2013 | Andrade et al. |
| 8,543,534 B2 | 9/2013 | Alves et al. |
| 8,619,793 B2 | 12/2013 | Lavian et al. |
| 8,626,957 B2 | 1/2014 | Blumrich et al. |
| 8,650,582 B2 | 2/2014 | Archer et al. |
| 8,706,832 B2 | 4/2014 | Blocksome |
| 8,719,543 B2 | 5/2014 | Kaminski et al. |
| 8,811,183 B1 | 8/2014 | Anand et al. |
| 8,948,175 B2 | 2/2015 | Bly et al. |
| 8,971,345 B1 | 3/2015 | Mccanne et al. |
| 9,001,663 B2 | 4/2015 | Attar et al. |
| 9,053,012 B1 | 6/2015 | Northcott et al. |
| 9,088,496 B2 | 7/2015 | Vaidya et al. |
| 9,094,327 B2 | 7/2015 | Jacobs et al. |
| 9,178,782 B2 | 11/2015 | Matthews et al. |
| 9,208,071 B2 | 12/2015 | Talagala et al. |
| 9,218,278 B2 | 12/2015 | Talagala et al. |
| 9,231,876 B2 | 1/2016 | Mir et al. |
| 9,231,888 B2 | 1/2016 | Bogdanski et al. |
| 9,239,804 B2 | 1/2016 | Kegel et al. |
| 9,269,438 B2 | 2/2016 | Nachimuthu et al. |
| 9,276,864 B1 | 3/2016 | Pradeep |
| 9,436,651 B2 | 9/2016 | Underwood et al. |
| 9,455,915 B2 | 9/2016 | Sinha et al. |
| 9,460,178 B2 | 10/2016 | Bashyam et al. |
| 9,479,426 B2 | 10/2016 | Munger et al. |
| 9,496,991 B2 | 11/2016 | Plamondon et al. |
| 9,544,234 B1 | 1/2017 | Markine |
| 9,548,924 B2 | 1/2017 | Pettit et al. |
| 9,594,521 B2 | 3/2017 | Blagodurov et al. |
| 9,635,121 B2 | 4/2017 | Mathew et al. |
| 9,742,855 B2 | 8/2017 | Shuler et al. |
| 9,762,488 B2 | 9/2017 | Previdi et al. |
| 9,762,497 B2 | 9/2017 | Kishore et al. |
| 9,830,273 B2 | 11/2017 | Bk et al. |
| 9,838,500 B1 | 12/2017 | Ilan et al. |
| 9,853,900 B1 | 12/2017 | Mula et al. |
| 9,887,923 B2 | 2/2018 | Chorafakis et al. |
| 10,003,544 B2 | 6/2018 | Liu et al. |
| 10,009,270 B1 | 6/2018 | Stark et al. |
| 10,031,857 B2 | 7/2018 | Menachem et al. |
| 10,050,896 B2 | 8/2018 | Yang et al. |
| 10,061,613 B1 | 8/2018 | Brooker et al. |
| 10,063,481 B1 | 8/2018 | Jiang et al. |
| 10,089,220 B1 | 10/2018 | Mckelvie et al. |
| 10,169,060 B1 | 1/2019 | Vincent et al. |
| 10,178,035 B2 | 1/2019 | Dillon |
| 10,200,279 B1 | 2/2019 | Aljaedi |
| 10,218,634 B2 | 2/2019 | Aldebert et al. |
| 10,270,700 B2 | 4/2019 | Burnette et al. |
| 10,305,772 B2 | 5/2019 | Zur et al. |
| 10,331,590 B2 | 6/2019 | Macnamara et al. |
| 10,353,833 B2 | 7/2019 | Hagspiel et al. |
| 10,454,835 B2 | 10/2019 | Contavalli et al. |
| 10,498,672 B2 | 12/2019 | Graham et al. |
| 10,567,307 B2 | 2/2020 | Fairhurst et al. |
| 10,728,173 B1 | 7/2020 | Agrawal et al. |
| 10,802,828 B1 | 10/2020 | Volpe et al. |
| 10,817,502 B2 | 10/2020 | Talagala et al. |
| 11,128,561 B1 | 9/2021 | Matthews et al. |
| 11,271,869 B1 | 3/2022 | Agrawal et al. |
| 11,416,749 B2 | 8/2022 | Bshara et al. |
| 11,444,886 B1 | 9/2022 | Stawitzky et al. |
| 2001/0010692 A1 | 8/2001 | Sindhu et al. |
| 2001/0047438 A1 | 11/2001 | Forin |
| 2002/0016883 A1* | 2/2002 | Musoll .................. G06F 12/023 711/171 |
| 2002/0174279 A1 | 11/2002 | Wynne et al. |
| 2003/0016808 A1 | 1/2003 | Hu et al. |
| 2003/0041168 A1 | 2/2003 | Musoll |
| 2003/0110455 A1 | 6/2003 | Baumgartner et al. |
| 2003/0174711 A1 | 9/2003 | Shankar |
| 2003/0200363 A1 | 10/2003 | Futral |
| 2003/0223420 A1 | 12/2003 | Ferolito |
| 2004/0008716 A1 | 1/2004 | Stiliadis |
| 2004/0059828 A1 | 3/2004 | Hooper et al. |
| 2004/0095882 A1 | 5/2004 | Hamzah et al. |
| 2004/0133634 A1 | 7/2004 | Luke et al. |
| 2004/0223452 A1 | 11/2004 | Santos et al. |
| 2005/0021837 A1 | 1/2005 | Haselhorst et al. |
| 2005/0047334 A1 | 3/2005 | Paul et al. |
| 2005/0088969 A1 | 4/2005 | Carlsen et al. |
| 2005/0091396 A1 | 4/2005 | Nilakantan et al. |
| 2005/0108444 A1 | 5/2005 | Flauaus et al. |
| 2005/0108518 A1 | 5/2005 | Pandya |
| 2005/0152274 A1 | 7/2005 | Simpson |
| 2005/0182854 A1 | 8/2005 | Pinkerton et al. |
| 2005/0270974 A1 | 12/2005 | Mayhew |
| 2005/0270976 A1 | 12/2005 | Yang et al. |
| 2006/0023705 A1 | 2/2006 | Zoranovic et al. |
| 2006/0067347 A1 | 3/2006 | Naik et al. |
| 2006/0075480 A1 | 4/2006 | Noehring et al. |
| 2006/0174251 A1 | 8/2006 | Pope et al. |
| 2006/0203728 A1 | 9/2006 | Kwan et al. |
| 2007/0061433 A1 | 3/2007 | Reynolds et al. |
| 2007/0070901 A1 | 3/2007 | Aloni et al. |
| 2007/0198804 A1 | 8/2007 | Moyer |
| 2007/0211746 A1 | 9/2007 | Oshikiri et al. |
| 2007/0242611 A1 | 10/2007 | Archer et al. |
| 2007/0268825 A1 | 11/2007 | Corwin et al. |
| 2008/0013453 A1 | 1/2008 | Chiang et al. |
| 2008/0013549 A1 | 1/2008 | Okagawa et al. |
| 2008/0071757 A1 | 3/2008 | Ichiriu et al. |
| 2008/0084864 A1 | 4/2008 | Archer et al. |
| 2008/0091915 A1 | 4/2008 | Moertl et al. |
| 2008/0147881 A1 | 6/2008 | Krishnamurthy et al. |
| 2008/0159138 A1 | 7/2008 | Shepherd et al. |
| 2008/0253289 A1 | 10/2008 | Naven et al. |
| 2009/0003212 A1 | 1/2009 | Kwan et al. |
| 2009/0010157 A1 | 1/2009 | Holmes et al. |
| 2009/0013175 A1 | 1/2009 | Elliott |
| 2009/0055496 A1 | 2/2009 | Garg et al. |
| 2009/0092046 A1 | 4/2009 | Naven et al. |
| 2009/0141621 A1 | 6/2009 | Fan et al. |
| 2009/0198958 A1 | 8/2009 | Arimilli et al. |

(56) References Cited

U.S. PATENT DOCUMENTS

| | | |
|---|---|---|
| 2009/0216964 A1* | 8/2009 | Palladino .............. G06F 13/28 711/E12.001 |
| 2009/0259713 A1 | 10/2009 | Blumrich et al. |
| 2009/0285222 A1 | 11/2009 | Hoover et al. |
| 2010/0061241 A1 | 3/2010 | Sindhu et al. |
| 2010/0169608 A1 | 7/2010 | Kuo et al. |
| 2010/0172260 A1 | 7/2010 | Kwan et al. |
| 2010/0183024 A1 | 7/2010 | Gupta |
| 2010/0220595 A1 | 9/2010 | Petersen |
| 2010/0274876 A1 | 10/2010 | Kagan et al. |
| 2010/0302942 A1 | 12/2010 | Shankar et al. |
| 2010/0316053 A1 | 12/2010 | Miyoshi et al. |
| 2011/0051724 A1 | 3/2011 | Scott et al. |
| 2011/0066824 A1 | 3/2011 | Bestler |
| 2011/0072179 A1 | 3/2011 | Lacroute et al. |
| 2011/0099326 A1 | 4/2011 | Jung et al. |
| 2011/0110383 A1 | 5/2011 | Yang et al. |
| 2011/0128959 A1 | 6/2011 | Bando et al. |
| 2011/0158096 A1 | 6/2011 | Leung et al. |
| 2011/0158248 A1 | 6/2011 | Vorunganti et al. |
| 2011/0164496 A1 | 7/2011 | Loh et al. |
| 2011/0173370 A1 | 7/2011 | Jacobs et al. |
| 2011/0264822 A1 | 10/2011 | Ferguson et al. |
| 2011/0276699 A1 | 11/2011 | Pedersen |
| 2011/0280125 A1 | 11/2011 | Jayakumar |
| 2011/0320724 A1 | 12/2011 | Mejdrich et al. |
| 2012/0093505 A1 | 4/2012 | Yeap et al. |
| 2012/0102506 A1 | 4/2012 | Hopmann et al. |
| 2012/0117423 A1 | 5/2012 | Andrade et al. |
| 2012/0137075 A1 | 5/2012 | Vorbach |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0155256 A1* | 6/2012 | Pope .................... H04L 47/6275 370/412 |
| 2012/0170462 A1 | 7/2012 | Sinha |
| 2012/0170575 A1 | 7/2012 | Mehra |
| 2012/0213118 A1 | 8/2012 | Lindsay et al. |
| 2012/0250512 A1 | 10/2012 | Jagadeeswaran et al. |
| 2012/0287821 A1 | 11/2012 | Godfrey et al. |
| 2012/0297083 A1 | 11/2012 | Ferguson et al. |
| 2012/0300669 A1 | 11/2012 | Zahavi |
| 2012/0314707 A1 | 12/2012 | Epps et al. |
| 2013/0010636 A1 | 1/2013 | Regula |
| 2013/0039169 A1 | 2/2013 | Schlansker et al. |
| 2013/0060944 A1 | 3/2013 | Archer et al. |
| 2013/0103777 A1 | 4/2013 | Kagan et al. |
| 2013/0121178 A1 | 5/2013 | Mainaud et al. |
| 2013/0136090 A1 | 5/2013 | Liu et al. |
| 2013/0182704 A1 | 7/2013 | Jacobs et al. |
| 2013/0194927 A1 | 8/2013 | Yamaguchi et al. |
| 2013/0203422 A1 | 8/2013 | Masputra et al. |
| 2013/0205002 A1 | 8/2013 | Wang et al. |
| 2013/0208593 A1 | 8/2013 | Nandagopal |
| 2013/0246552 A1 | 9/2013 | Underwood et al. |
| 2013/0290673 A1 | 10/2013 | Archer et al. |
| 2013/0301645 A1 | 11/2013 | Bogdanski et al. |
| 2013/0304988 A1 | 11/2013 | Totolos et al. |
| 2013/0311525 A1 | 11/2013 | Neerincx et al. |
| 2013/0329577 A1 | 12/2013 | Suzuki et al. |
| 2013/0336164 A1 | 12/2013 | Yang et al. |
| 2014/0019661 A1 | 1/2014 | Hormuth et al. |
| 2014/0032695 A1 | 1/2014 | Michels et al. |
| 2014/0036680 A1 | 2/2014 | Lih et al. |
| 2014/0064082 A1 | 3/2014 | Yeung et al. |
| 2014/0095753 A1 | 4/2014 | Crupnicoff et al. |
| 2014/0098675 A1 | 4/2014 | Frost et al. |
| 2014/0119367 A1 | 5/2014 | Han et al. |
| 2014/0122560 A1 | 5/2014 | Ramey et al. |
| 2014/0129664 A1 | 5/2014 | Mcdaniel et al. |
| 2014/0133292 A1 | 5/2014 | Yamatsu et al. |
| 2014/0136646 A1 | 5/2014 | Tamir et al. |
| 2014/0169173 A1 | 6/2014 | Naouri et al. |
| 2014/0185621 A1 | 7/2014 | Decusatis et al. |
| 2014/0189174 A1 | 7/2014 | Ajanovic et al. |
| 2014/0207881 A1 | 7/2014 | Nussle et al. |
| 2014/0211804 A1 | 7/2014 | Makikeni et al. |
| 2014/0226488 A1 | 8/2014 | Shamis et al. |
| 2014/0241164 A1 | 8/2014 | Cociglio et al. |
| 2014/0258438 A1 | 9/2014 | Ayoub |
| 2014/0301390 A1 | 10/2014 | Scott et al. |
| 2014/0307554 A1 | 10/2014 | Basso et al. |
| 2014/0325013 A1 | 10/2014 | Tamir et al. |
| 2014/0328172 A1 | 11/2014 | Kumar et al. |
| 2014/0347997 A1 | 11/2014 | Bergamasco et al. |
| 2014/0362698 A1 | 12/2014 | Arad |
| 2014/0369360 A1 | 12/2014 | Carlstrom |
| 2014/0379847 A1 | 12/2014 | Williams |
| 2015/0003247 A1 | 1/2015 | Mejia et al. |
| 2015/0006849 A1 | 1/2015 | Xu et al. |
| 2015/0009823 A1 | 1/2015 | Ganga et al. |
| 2015/0026361 A1 | 1/2015 | Matthews et al. |
| 2015/0029848 A1 | 1/2015 | Jain |
| 2015/0055476 A1 | 2/2015 | Decusatis et al. |
| 2015/0055661 A1 | 2/2015 | Boucher et al. |
| 2015/0067095 A1 | 3/2015 | Gopal et al. |
| 2015/0089495 A1 | 3/2015 | Persson et al. |
| 2015/0103667 A1 | 4/2015 | Elias et al. |
| 2015/0124826 A1 | 5/2015 | Edsall et al. |
| 2015/0146527 A1 | 5/2015 | Kishore et al. |
| 2015/0154004 A1 | 6/2015 | Aggarwal |
| 2015/0161064 A1 | 6/2015 | Pope |
| 2015/0180782 A1 | 6/2015 | Rimmer et al. |
| 2015/0186318 A1 | 7/2015 | Kim et al. |
| 2015/0193262 A1 | 7/2015 | Archer et al. |
| 2015/0195388 A1 | 7/2015 | Snyder et al. |
| 2015/0208145 A1 | 7/2015 | Parker et al. |
| 2015/0220449 A1 | 8/2015 | Stark et al. |
| 2015/0237180 A1 | 8/2015 | Swartzentruber et al. |
| 2015/0244617 A1 | 8/2015 | Nakil et al. |
| 2015/0244804 A1 | 8/2015 | Warfield et al. |
| 2015/0261434 A1 | 9/2015 | Kagan et al. |
| 2015/0263955 A1 | 9/2015 | Talaski et al. |
| 2015/0263994 A1 | 9/2015 | Haramaty et al. |
| 2015/0288626 A1 | 10/2015 | Aybay |
| 2015/0365337 A1 | 12/2015 | Pannell |
| 2015/0370586 A1 | 12/2015 | Cooper et al. |
| 2016/0006664 A1 | 1/2016 | Sabato et al. |
| 2016/0012002 A1 | 1/2016 | Arimilli et al. |
| 2016/0028613 A1 | 1/2016 | Haramaty et al. |
| 2016/0065455 A1 | 3/2016 | Wang et al. |
| 2016/0094450 A1 | 3/2016 | Ghanwani et al. |
| 2016/0134518 A1 | 5/2016 | Callon et al. |
| 2016/0134535 A1 | 5/2016 | Callon |
| 2016/0134559 A1 | 5/2016 | Abel et al. |
| 2016/0134573 A1 | 5/2016 | Gagliardi et al. |
| 2016/0142318 A1 | 5/2016 | Beecroft |
| 2016/0154756 A1 | 6/2016 | Dodson et al. |
| 2016/0182383 A1 | 6/2016 | Pedersen |
| 2016/0205023 A1 | 7/2016 | Janardhanan |
| 2016/0226797 A1 | 8/2016 | Aravinthan et al. |
| 2016/0254991 A1 | 9/2016 | Eckert et al. |
| 2016/0259394 A1 | 9/2016 | Ragavan |
| 2016/0283422 A1 | 9/2016 | Crupnicoff et al. |
| 2016/0285545 A1 | 9/2016 | Schmidtke et al. |
| 2016/0285677 A1 | 9/2016 | Kashyap et al. |
| 2016/0294694 A1 | 10/2016 | Parker et al. |
| 2016/0294926 A1 | 10/2016 | Zur et al. |
| 2016/0301610 A1 | 10/2016 | Amit et al. |
| 2016/0344620 A1 | 11/2016 | G. Santos et al. |
| 2016/0381189 A1 | 12/2016 | Caulfield et al. |
| 2017/0024263 A1 | 1/2017 | Verplanken |
| 2017/0039063 A1 | 2/2017 | Gopal et al. |
| 2017/0041239 A1 | 2/2017 | Goldenberg et al. |
| 2017/0048144 A1 | 2/2017 | Liu |
| 2017/0054633 A1 | 2/2017 | Underwood et al. |
| 2017/0091108 A1 | 3/2017 | Arellano et al. |
| 2017/0097840 A1 | 4/2017 | Bridgers |
| 2017/0103108 A1 | 4/2017 | Datta et al. |
| 2017/0118090 A1 | 4/2017 | Pettit et al. |
| 2017/0118098 A1 | 4/2017 | Littlejohn et al. |
| 2017/0153852 A1* | 6/2017 | Ma .................... G06F 3/0656 |
| 2017/0177541 A1 | 6/2017 | Berman et al. |
| 2017/0220500 A1 | 8/2017 | Tong |

(56) References Cited

U.S. PATENT DOCUMENTS

| | | |
|---|---|---|
| 2017/0237654 A1 | 8/2017 | Turner et al. |
| 2017/0237671 A1 | 8/2017 | Rimmer et al. |
| 2017/0242753 A1 | 8/2017 | Sherlock et al. |
| 2017/0250914 A1 | 8/2017 | Caulfield et al. |
| 2017/0251394 A1 | 8/2017 | Johansson et al. |
| 2017/0270051 A1 | 9/2017 | Chen et al. |
| 2017/0272331 A1 | 9/2017 | Lissack |
| 2017/0272370 A1 | 9/2017 | Ganga et al. |
| 2017/0286316 A1 | 10/2017 | Doshi et al. |
| 2017/0289066 A1 | 10/2017 | Haramaty et al. |
| 2017/0295098 A1 | 10/2017 | Watkins et al. |
| 2017/0324664 A1 | 11/2017 | Xu et al. |
| 2017/0371778 A1 | 12/2017 | Mckelvie et al. |
| 2018/0004705 A1 | 1/2018 | Menachem et al. |
| 2018/0019948 A1 | 1/2018 | Patwardhan et al. |
| 2018/0026878 A1 | 1/2018 | Zahavi et al. |
| 2018/0077064 A1 | 3/2018 | Wang |
| 2018/0083868 A1 | 3/2018 | Cheng |
| 2018/0097645 A1 | 4/2018 | Rajagopalan et al. |
| 2018/0097912 A1 | 4/2018 | Chumbalkar et al. |
| 2018/0113618 A1 | 4/2018 | Chan et al. |
| 2018/0115469 A1 | 4/2018 | Erickson et al. |
| 2018/0131602 A1 | 5/2018 | Civanlar et al. |
| 2018/0131678 A1 | 5/2018 | Agarwal et al. |
| 2018/0150374 A1 | 5/2018 | Ratcliff |
| 2018/0152317 A1 | 5/2018 | Chang et al. |
| 2018/0152357 A1 | 5/2018 | Natham et al. |
| 2018/0173557 A1 | 6/2018 | Nakil et al. |
| 2018/0183724 A1 | 6/2018 | Callard et al. |
| 2018/0191609 A1 | 7/2018 | Caulfield et al. |
| 2018/0198736 A1 | 7/2018 | Labonte et al. |
| 2018/0212876 A1 | 7/2018 | Bacthu et al. |
| 2018/0212902 A1 | 7/2018 | Steinmacher-Burow |
| 2018/0219804 A1 | 8/2018 | Graham et al. |
| 2018/0225238 A1 | 8/2018 | Karguth et al. |
| 2018/0234343 A1 | 8/2018 | Zdornov et al. |
| 2018/0254945 A1 | 9/2018 | Bogdanski et al. |
| 2018/0260324 A1 | 9/2018 | Marathe et al. |
| 2018/0278540 A1 | 9/2018 | Shalev et al. |
| 2018/0287928 A1 | 10/2018 | Levi et al. |
| 2018/0323898 A1 | 11/2018 | Dods |
| 2018/0335974 A1 | 11/2018 | Simionescu et al. |
| 2018/0341494 A1 | 11/2018 | Sood et al. |
| 2019/0007349 A1 | 1/2019 | Wang et al. |
| 2019/0018808 A1 | 1/2019 | Beard et al. |
| 2019/0036771 A1 | 1/2019 | Sharpless et al. |
| 2019/0042337 A1 | 2/2019 | Dinan et al. |
| 2019/0042518 A1 | 2/2019 | Marolia |
| 2019/0044809 A1 | 2/2019 | Willis et al. |
| 2019/0044827 A1 | 2/2019 | Ganapathi et al. |
| 2019/0044863 A1 | 2/2019 | Mula et al. |
| 2019/0044872 A1 | 2/2019 | Ganapathi et al. |
| 2019/0044875 A1 | 2/2019 | Murty et al. |
| 2019/0052327 A1 | 2/2019 | Motozuka et al. |
| 2019/0058663 A1 | 2/2019 | Song |
| 2019/0068501 A1 | 2/2019 | Schneider et al. |
| 2019/0081903 A1 | 3/2019 | Kobayashi et al. |
| 2019/0095134 A1 | 3/2019 | Li |
| 2019/0104057 A1 | 4/2019 | Goel et al. |
| 2019/0104206 A1 | 4/2019 | Goel et al. |
| 2019/0108106 A1 | 4/2019 | Aggarwal et al. |
| 2019/0108332 A1 | 4/2019 | Glew et al. |
| 2019/0109791 A1 | 4/2019 | Mehra et al. |
| 2019/0121781 A1 | 4/2019 | Kasichainula |
| 2019/0140979 A1 | 5/2019 | Levi et al. |
| 2019/0146477 A1 | 5/2019 | Cella et al. |
| 2019/0171612 A1 | 6/2019 | Shahar et al. |
| 2019/0196982 A1 | 6/2019 | Rozas et al. |
| 2019/0199646 A1 | 6/2019 | Singh et al. |
| 2019/0253354 A1 | 8/2019 | Caulfield et al. |
| 2019/0280978 A1 | 9/2019 | Schmatz et al. |
| 2019/0294575 A1 | 9/2019 | Dennison et al. |
| 2019/0306134 A1 | 10/2019 | Shanbhogue et al. |
| 2019/0332314 A1 | 10/2019 | Zhang et al. |
| 2019/0334624 A1 | 10/2019 | Bernard |
| 2019/0356611 A1 | 11/2019 | Das et al. |
| 2019/0361728 A1 | 11/2019 | Kumar et al. |
| 2019/0379610 A1 | 12/2019 | Srinivasan et al. |
| 2020/0036644 A1 | 1/2020 | Belogolovy et al. |
| 2020/0084150 A1 | 3/2020 | Burstein et al. |
| 2020/0145725 A1 | 5/2020 | Eberle et al. |
| 2020/0177505 A1 | 6/2020 | Li |
| 2020/0177521 A1 | 6/2020 | Blumrich et al. |
| 2020/0259755 A1 | 8/2020 | Wang et al. |
| 2020/0272579 A1 | 8/2020 | Humphrey et al. |
| 2020/0274832 A1 | 8/2020 | Humphrey et al. |
| 2020/0334195 A1 | 10/2020 | Chen et al. |
| 2020/0349098 A1 | 11/2020 | Caulfield et al. |
| 2021/0081410 A1 | 3/2021 | Chavan et al. |
| 2021/0152494 A1 | 5/2021 | Johnsen et al. |
| 2021/0263779 A1 | 8/2021 | Haghighat et al. |
| 2021/0334206 A1 | 10/2021 | Colgrove et al. |
| 2021/0377156 A1 | 12/2021 | Michael et al. |
| 2021/0409351 A1 | 12/2021 | Das et al. |
| 2022/0131768 A1 | 4/2022 | Ganapathi et al. |
| 2022/0166705 A1 | 5/2022 | Froese |
| 2022/0200900 A1 | 6/2022 | Roweth |
| 2022/0210058 A1 | 6/2022 | Bataineh et al. |
| 2022/0217078 A1 | 7/2022 | Ford et al. |
| 2022/0217101 A1 | 7/2022 | Yefet et al. |
| 2022/0245072 A1 | 8/2022 | Roweth et al. |
| 2022/0278941 A1 | 9/2022 | Shalev et al. |
| 2022/0309025 A1 | 9/2022 | Chen et al. |
| 2023/0035420 A1 | 2/2023 | Sankaran et al. |
| 2023/0046221 A1 | 2/2023 | Pismenny et al. |

FOREIGN PATENT DOCUMENTS

| | | |
|---|---|---|
| CN | 110324249 A | 10/2019 |
| CN | 110601888 A | 12/2019 |
| EP | 0275135 A2 | 7/1988 |
| EP | 2187576 A1 | 5/2010 |
| EP | 2219329 A1 | 8/2010 |
| EP | 2947832 A1 | 11/2015 |
| EP | 3445006 A1 | 2/2019 |
| JP | 2003-244196 A | 8/2003 |
| JP | 3459653 B2 | 10/2003 |
| KR | 10-2012-0062864 A | 6/2012 |
| KR | 10-2012-0082739 A | 7/2012 |
| KR | 10-2014-0100529 A | 8/2014 |
| KR | 10-2015-0026939 A | 3/2015 |
| KR | 10-2015-0104056 A | 9/2015 |
| KR | 10-2017-0110106 A | 10/2017 |
| KR | 10-1850749 B1 | 4/2018 |
| WO | 2001/069851 A2 | 9/2001 |
| WO | 02/47329 A2 | 6/2002 |
| WO | 2003/019861 A2 | 3/2003 |
| WO | 2004/001615 A1 | 12/2003 |
| WO | 2005/094487 A2 | 10/2005 |
| WO | 2007/034184 A2 | 3/2007 |
| WO | 2009/010461 A2 | 1/2009 |
| WO | 2009/018232 A1 | 2/2009 |
| WO | 2014/092780 A1 | 6/2014 |
| WO | 2014/137382 A1 | 9/2014 |
| WO | 2014/141005 A1 | 9/2014 |
| WO | 2018/004977 A1 | 1/2018 |
| WO | 2018/046703 A1 | 3/2018 |
| WO | 2019/072072 A1 | 4/2019 |

OTHER PUBLICATIONS

Awerbuch, B., et al.; "An On-Demand Secure Routing Protocol Resilient to Byzantine Failures"; Sep. 2002; 10 pages.

Belayneh L.W., et al.; "Method and Apparatus for Routing Data in an Inter-Nodal Communications Lattice of a Massively Parallel Computer System by Semi-Randomly Varying Routing Policies for Different Packets"; 2019; 3 pages.

Bhatele, A., et al.; "Analyzing Network Health and Congestion in Dragonfly-based Supercomputers"; May 23-27, 2016; 10 pages.

Blumrich, M.A., et al.; "Exploiting Idle Resources in a High-Radix Switch for Supplemental Storage"; Nov. 2018; 13 pages.

(56) References Cited

OTHER PUBLICATIONS

Chang, F., et al.; "PVW: Designing Vir PVW: Designing Virtual World Ser orld Server Infr er Infrastructur astructure"; 2010; 8 pages.
Chang, F., et al; "PVW: Designing Virtual World Server Infrastructure"; 2010; 8 pages.
Chen, F., et al.; "Requirements for RoCEv3 Congestion Management"; Mar. 21, 2019; 8 pages.
Cisco Packet Tracer; "packet-tracer,—ping"; https://www.cisco.com/c/en/us/td/docs/security/asa/asa-command-reference/I-R/cmdref2/p1.html; 2017.
Cisco; "Understanding Rapid Spanning Tree Protocol (802.1w)"; Aug. 1, 2017; 13 pages.
Eardley, Ed, P; "Pre-Congestion Notification (PCN) Architecture"; Jun. 2009; 54 pages.
Escudero-Sahuquillo, J., et al.; "Combining Congested-Flow Isolation and Injection Throttling in HPC Interconnection Networks"; Sep. 13-16, 2011; 3 pages.
Hong, Y.; "Mitigating the Cost, Performance, and Power Overheads Induced by Load Variations in Multicore Cloud Servers"; Fall 2013; 132 pages.
Huawei; "The Lossless Network for Data Centers"; Nov. 7, 2017; 15 pages.
International Search Report and Written Opinion received for PCT Application No. PCT/US2020/024248, dated Jul. 8, 2020, 11 pages.
International Search Report and Written Opinion received for PCT Application No. PCT/US20/024332, dated Jul. 8, 2020, 13 pages.
International Search Report and Written Opinion received for PCT Application No. PCT/US20/24243, dated Jul. 9, 2020, 10 pages.
International Search Report and Written Opinion received for PCT Application No. PCT/US20/24253, dated Jul. 6, 2020, 12 pages.
International Search Report and Written Opinion received for PCT Application No. PCT/US20/24256, dated Jul. 7, 2020, 11 pages.
International Search Report and Written Opinion received for PCT Application No. PCT/US20/24257, dated Jul. 7, 2020, 10 pages.
International Search Report and Written Opinion received for PCT Application No. PCT/US20/24258, dated Jul. 7, 2020, 9 pages.
International Search Report and Written Opinion received for PCT Application No. PCT/US20/24259, dated Jul. 9, 2020, 13 pages.
International Search Report and Written Opinion received for PCT Application No. PCT/US20/24260, dated Jul. 7, 2020, 11 pages.
International Search Report and Written Opinion received for PCT Application No. PCT/US20/24268, dated Jul. 9, 2020, 11 pages.
International Search Report and Written Opinion received for PCT Application No. PCT/US20/24269, dated Jul. 9, 2020, 11 pages.
International Search Report and Written Opinion received for PCT Application No. PCT/US20/24339, dated Jul. 8, 2020, 11 pages.
International Search Report and Written Opinion received for PCT Application No. PCT/US2020/024125, dated Jul. 10, 2020, 5 pages.
International Search Report and Written Opinion received for PCT Application No. PCT/US2020/024129, dated Jul. 10, 2020, 11 pages.
International Search Report and Written Opinion received for PCT Application No. PCT/US2020/024237, dated Jul. 14, 2020, 5 pages.
International Search Report and Written Opinion received for PCT Application No. PCT/US2020/024239, dated Jul. 14, 2020, 11 pages.
International Search Report and Written Opinion received for PCT Application No. PCT/US2020/024241, dated Jul. 14, 2020, 13 pages.
International Search Report and Written Opinion received for PCT Application No. PCT/US2020/024244, dated Jul. 13, 2020, 10 pages.
International Search Report and Written Opinion received for PCT Application No. PCT/US2020/024245, dated Jul. 14, 2020, 11 pages.
International Search Report and Written Opinion received for PCT Application No. PCT/US2020/024246, dated Jul. 14, 2020, 10 pages.
International Search Report and Written Opinion received for PCT Application No. PCT/US2020/024250, dated Jul. 14, 2020, 12 pages.
International Search Report and Written Opinion received for PCT Application No. PCT/US2020/024254, dated Jul. 13, 2020, 10 pages.
International Search Report and Written Opinion received for PCT Application No. PCT/US2020/024262, dated Jul. 13, 2020, 10 pages.
International Search Report and Written Opinion received for PCT Application No. PCT/US2020/024266, dated Jul. 9, 2020, 10 pages.
International Search Report and Written Opinion received for PCT Application No. PCT/US2020/024270, dated Jul. 10, 2020, 13 pages.
International Search Report and Written Opinion received for PCT Application No. PCT/US2020/024271, dated Jul. 9, 2020, 10 pages.
International Search Report and Written Opinion received for PCT Application No. PCT/US2020/024272, dated Jul. 9, 2020, 10 pages.
International Search Report and Written Opinion received for PCT Application No. PCT/US2020/024276, dated Jul. 13, 2020, 9 pages.
International Search Report and Written Opinion received for PCT Application No. PCT/US2020/024304, dated Jul. 15, 2020, 11 pages.
International Search Report and Written Opinion received for PCT Application No. PCT/US2020/024311, dated Jul. 17, 2020, 8 pages.
International Search Report and Written Opinion received for PCT Application No. PCT/US2020/024321, dated Jul. 9, 2020, 9 pages.
International Search Report and Written Opinion received for PCT Application No. PCT/US2020/024324, dated Jul. 14, 2020, 10 pages.
International Search Report and Written Opinion received for PCT Application No. PCT/US2020/024327, dated Jul. 10, 2020, 15 pages.
International Search Report and Written Opinion received for PCT Application No. PCT/US2020/24158, dated Jul. 6, 2020, 18 pages.
International Search Report and Written Opinion received for PCT Application No. PCT/US2020/24251, dated Jul. 6, 2020, 11 pages.
International Search Report and Written Opinion received for PCT Application No. PCT/US2020/24267, dated Jul. 6, 2020, 9 pages.
International Search Report and Written Opinion received for PCT Patent Application No. PCT/US20/24303, dated Oct. 21, 2020, 9 pages.
International Search Report and Written Opinion received for PCT Patent Application No. PCT/US20/24340, dated Oct. 26, 2020, 9 pages.
International Search Report and Written Opinion received for PCT Patent Application No. PCT/US20/24342, dated Oct. 27, 2020, 10 pages.
International Search Report and Written Opinion received for PCT Patent Application No. PCT/US2020/024192, dated Oct. 23, 2020, 9 pages.
International Search Report and Written Opinion received for PCT Patent Application No. PCT/US2020/024221, dated Oct. 26, 2020, 9 pages.
International Search Report cited in PCT/US2020/024170 dated Dec. 16, 2020; 3 pages.
Maabi, S., et al.; "ERFAN: Efficient reconfigurable fault-tolerant deflection routing algorithm for 3-D Network-on-Chip"; Sep. 6-9, 2016.
Maglione-Mathey, G., et al.; "Scalable Deadlock-Free Deterministic Minimal-Path Routing Engine for InfiniBand-Based Dragonfly Networks"; Aug. 21, 2017; 15 pages.
Mamidala, A.R., et al.; "Efficient Barrier and Allreduce on Infiniband clusters using multicast and adaptive algorithms"; Sep. 20-23, 2004; 10 pages.
Mammeri, Z; "Reinforcement Learning Based Routing in Networks: Review and Classification of Approaches"; Apr. 29, 2019; 35 pages.
Mollah; M. A., et al.; "High Performance Computing Systems. Performance Modeling, Benchmarking, and Simulation: 8th International Workshop"; Nov. 13, 2017.
Open Networking Foundation; "OpenFlow Switch Specification"; Mar. 26, 2015; 283 pages.

(56) References Cited

OTHER PUBLICATIONS

Prakash, P., et al.; "The TCP Outcast Problem: Exposing Unfairness in Data Center Networks"; 2011; 15 pages.
Ramakrishnan, K., et al.; "The Addition of Explicit Congestion Notification (ECN) to IP"; Sep. 2001; 63 pages.
Roth, P. C., et al; "MRNet: A Software-Based Multicast/Reduction Network for Scalable Tools1"; Nov. 15-21, 2003; 16 pages.
Silveira, J., et al.; "Preprocessing of Scenarios for Fast and Efficient Routing Reconfiguration in Fault-Tolerant NoCs"; Mar. 4-6, 2015.
Tsunekawa, K.; "Fair bandwidth allocation among LSPs for AF class accommodating TCP and UDP traffic in a Diffserv-capable MPLS network"; Nov. 17, 2005; 9 pages.
Underwood, K.D., et al.; "A hardware acceleration unit for MPI queue processing"; Apr. 18, 2005; 10 pages.
Wu, J.; "Fault-tolerant adaptive and minimal routing in mesh-connected multicomputers using extended safety levels"; Feb. 2000; 11 pages.
Xiang, D., et al.; "Fault-Tolerant Adaptive Routing in Dragonfly Networks"; Apr. 12, 2017; 15 pages.
Xiang, D., et al; "Deadlock-Free Broadcast Routing in Dragonfly Networks without Virtual Channels", submission to IEEE transactions on Parallel and Distributed Systems, 2015, 15 pages.
Extended European Search Report and Search Opinion received for EP Application No. 20809930.9, dated Mar. 2, 2023, 9 pages.
Extended European Search Report and Search Opinion received for EP Application No. 20810784.7, dated Mar. 9, 2023, 7 pages.
Ramakrishnan et al, RFC 3168, "The addition of Explicit Congestion Notification (ECN) to IP", Sep. 2001 (Year: 2001).

\* cited by examiner

SYSTEM AND METHOD FOR FACILITATING EFFICIENT UTILIZATION OF AN OUTPUT BUFFER IN A NETWORK INTERFACE CONTROLLER (NIC)

BACKGROUND

Field

This is generally related to the technical field of networking. More specifically, this disclosure is related to systems and methods for facilitating efficient utilization of an output buffer in a network interface controller (NIC).

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (JOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of efficiently utilizing an output buffer is provided. The NIC can be equipped with an output buffer, a host interface, an injector logic block, and an allocation logic block. The output buffer can include a plurality of cells, each of which can be a unit of storage in the output buffer. If the host interface receives a command from a host device, the injector logic block can generate a packet based on the command. The allocation logic block can then determine whether the packet is a multi-cell packet. If the packet is a multi-cell packet, the allocation logic block can determine a virtual index for the packet. The allocation logic block can then store, in an entry in a data structure, the virtual index, and a set of physical indices of cells storing the packet.

BRIEF DESCRIPTION OF THE FIGURES

In the figures, like reference numerals refer to the same figure elements.

DETAILED DESCRIPTION

Figure 1:
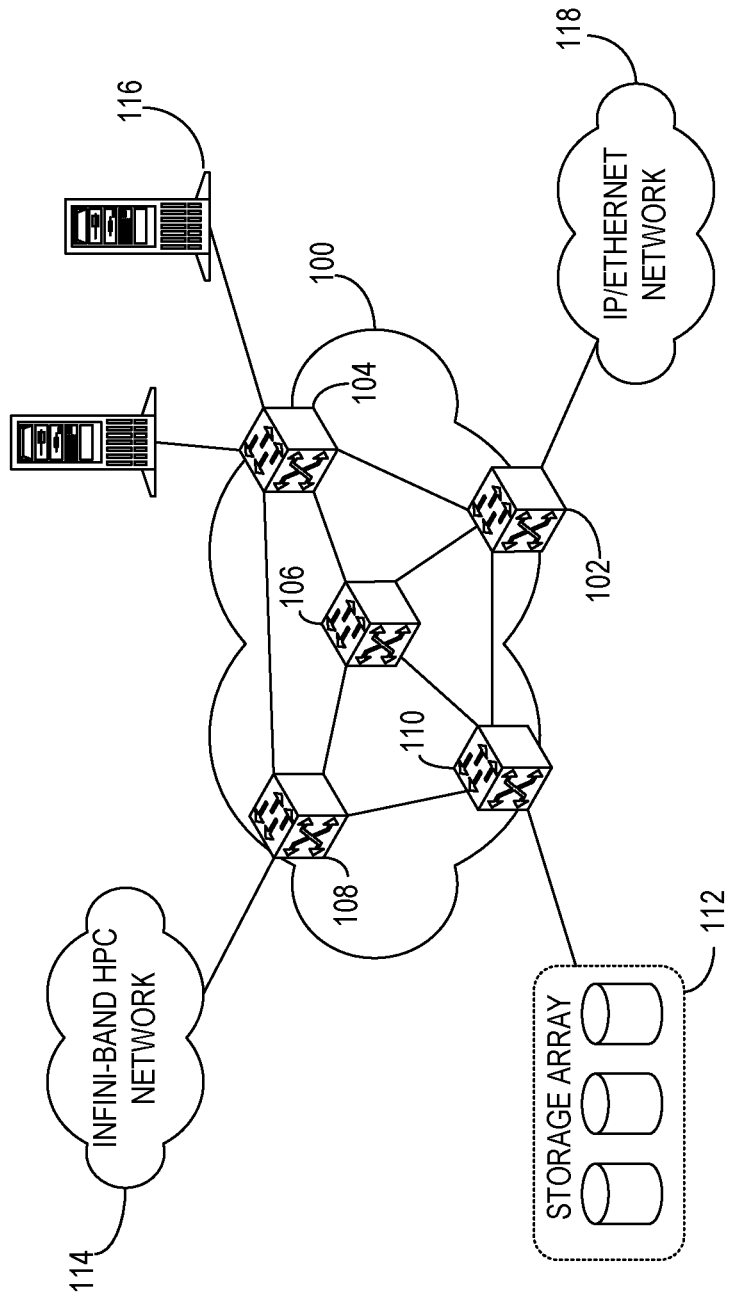
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate efficient utilization of an output buffer in a network interface controller (NIC). The NIC allows a host to communicate with a data-driven network. The network can accommodate dynamic data traffic with fast, effective congestion control by maintaining state information of individual packet streams.

The embodiments described herein solve the problem of efficiently allocating packets from a plurality of injectors to a shared output buffer of a NIC by (i) representing a multi-cell packet as a virtual packet index, and (ii) storing the packet in a plurality of cells of the output buffer and representing the indices of the cells based on the virtual packet index. An injector can be any element of the NIC that may inject traffic into the buffer.

During operation, the NIC may receive a command from a host device of the NIC. A host interface of the NIC may couple the NIC with the host device and facilitate the communication between the host device and the NIC. The command can be an immediate data command (IDC) or a direct memory access (DMA) command. A command that carries the data associated with the command can be an IDC. On the other hand, a command with one or more pointers to the relevant data is referred to as a DMA command (DMAC) (e.g., a "GET" or a "PUT" command of remote DMA (RDMA)). Furthermore, the traffic generated based on the commands can be assigned to different classes, such as traffic shaping classes or buffer classes. Each buffer class may be associated with one or more injectors. On the other hand, an injector may be allocated to one buffer class. Consequently, for the same buffer class, multiple injectors may send packets in parallel.

However, the injectors may share a common output buffer. To facilitate efficient data access, the output buffer can support both sequential and random access to the stored data. As a result, the NIC can insert the packets generated by a command into the buffer at any available location without requiring it to be contiguous. This allows the buffer to store packets while avoiding fragmentation of available capacity in the buffer. The buffer can be organized as cells, which can be memory locations in a memory device (e.g., a static random-access memory (SRAM) module). A respective cell can have a fixed size (e.g., 256 bytes). An injector may insert traffic into the buffer at a granularity of the cell size. Typically, a cell-based buffer can be implemented based on a linked-list so that multi-cell packets can be accessed from the buffer. However, such an implementation may not provide an efficient way to access the buffer at random locations.

To solve this problem, the NIC can represent a multi-cell packet based on a virtual packet index (VPI). Since a multi-cell packet can be stored across multiple cells, a VPI for the packet can be associated with a set of pointers. A respective pointer can correspond to a physical cell in the buffer that may store a portion of the packet (e.g., a packet segment). Such a pointer can be referred to as a physical cell index (PCI). To access a portion of the packet, the NIC can use the VPI and an offset associated with the VPI. The offset can indicate a PCI that may store that portion of the packet. On the other hand, if a packet can fit in a single cell, the NIC can use the PCI instead of the VPI to represent the packet in the buffer.

The NIC can maintain a translation table that can store a respective VPI and a set of PCIs associated with the VPI. Each VPI can indicate an entry in the translation table. Each entry can include a number of slots, each indicated by an offset. Each PCI is associated with the VPI can be stored in a slot and can be retrieved based on the offset associated with the VPI. For example, if the packet is distributed across 3 cells, the slot corresponding to the initial offset (i.e., the zero offset) can include a PCI to the first (or head) cell storing the packet. The first offset can indicate the next slot that can store the PCI of the second cell. Similarly, the second offset can indicate the subsequent slot that can store the PCI of the third cell. Hence, to represent such a packet, the entry may need at least three slots. However, different packets can have different lengths and may require different numbers of cells. As a result, if each entry in the translation table can include a number of slots such that the entry can accommodate a packet of a maximum length, some entries may have unused slots.

To reduce the number of pointers in the translation table, the NIC can facilitate a number of packet groups. Each of the packet groups can represent a distinct maximum packet size (e.g., 1 kilobyte (KB), 3 KB, and 10 KB). The translation table can include a set of entries for each packet group. If the size of a cell is 256 bytes and the length of a packet is 1 KB, each entry of the corresponding packet group can include 4 slots. Therefore, the offset value of such an entry can be 4. Similarly, each entry of the packet group of 3 KB packets can include 12 slots, and the corresponding offset value can be 12. Since each entry of the translation table can be represented by a VPI and an offset, the same translation table can have entries with different numbers of slots.

Based on the maximum packet size for a packet group, the NIC may determine the number of VPIs required for that packet group. For example, a packet group of 3 KB packet size can store packets that are between 1025 and 3072 bytes. If the size of a cell is 256 bytes and the number cells in the output buffer is 1024, a packet of the packet group may need at last 5 cells. Therefore, the maximum number of VPIs needed for that packet group can be 1024/5=204. The packet group sizes can then be determined to optimize the utilization of the hardware resources of the NIC. This mechanism allows the NIC to utilize the output buffer, in its entirety, for storing packets irrespective of the size of each packet. This mechanism can avoid fragmentation in the output buffer, and provide both sequential and random access to a respective packet in the output buffer. In some embodiments, an injector can be a message chopping unit (MCU) module, which can fragment a message into packets of sizes corresponding to a maximum transmission unit (MTU).

One embodiment of the present invention provides a NIC that can be equipped with an output buffer, a host interface, an injector logic block, and an allocation logic block. The output buffer can include a plurality of cells, each of which can be a unit of storage in the output buffer. If the host interface receives a command from a host device, the injector logic block can generate a packet based on the command. The allocation logic block can then determine whether the packet is a multi-cell packet. If the packet is a multi-cell packet, the allocation logic block can determine a virtual index for the packet. The allocation logic block can then store, in an entry in a data structure, the virtual index and a set of physical indices of cells storing the packet.

In a variation on this embodiment, the entry can be identified by the virtual index and include a set of slots. Each slot may store a physical index of the set of physical indices.

In a variation on this embodiment, the injector logic block can generate a packet segment based on a size of a cell and store the packet segment in a cell identified by a physical index of the set of physical indices.

In a further variation, the allocation logic block can determine a packet group for the packet. The packet group can indicate the maximum size of a packet supported by the entry.

In a further variation, the data structure can include entries for a plurality of packet groups.

In a variation on this embodiment, the cells storing the packet are non-contiguous in the output buffer.

In a variation on this embodiment, the NIC can include a retrieval logic block that can determine a packet handle and an offset associated with the packet, identify the entry based on the packet handle, and obtain the set of physical indices from the entry.

In a further variation, the retrieval logic block can obtain a packet segment from a respective cell associated with a physical index of the set of physical indices.

In a further variation, the allocation logic block can release the entry for reallocation.

In a variation on this embodiment, if the packet is a single-cell packet, the allocation logic block can determine a physical index of a cell for the packet. The injector logic block can then store the packet in a cell identified by the physical index.

Figure 2A:
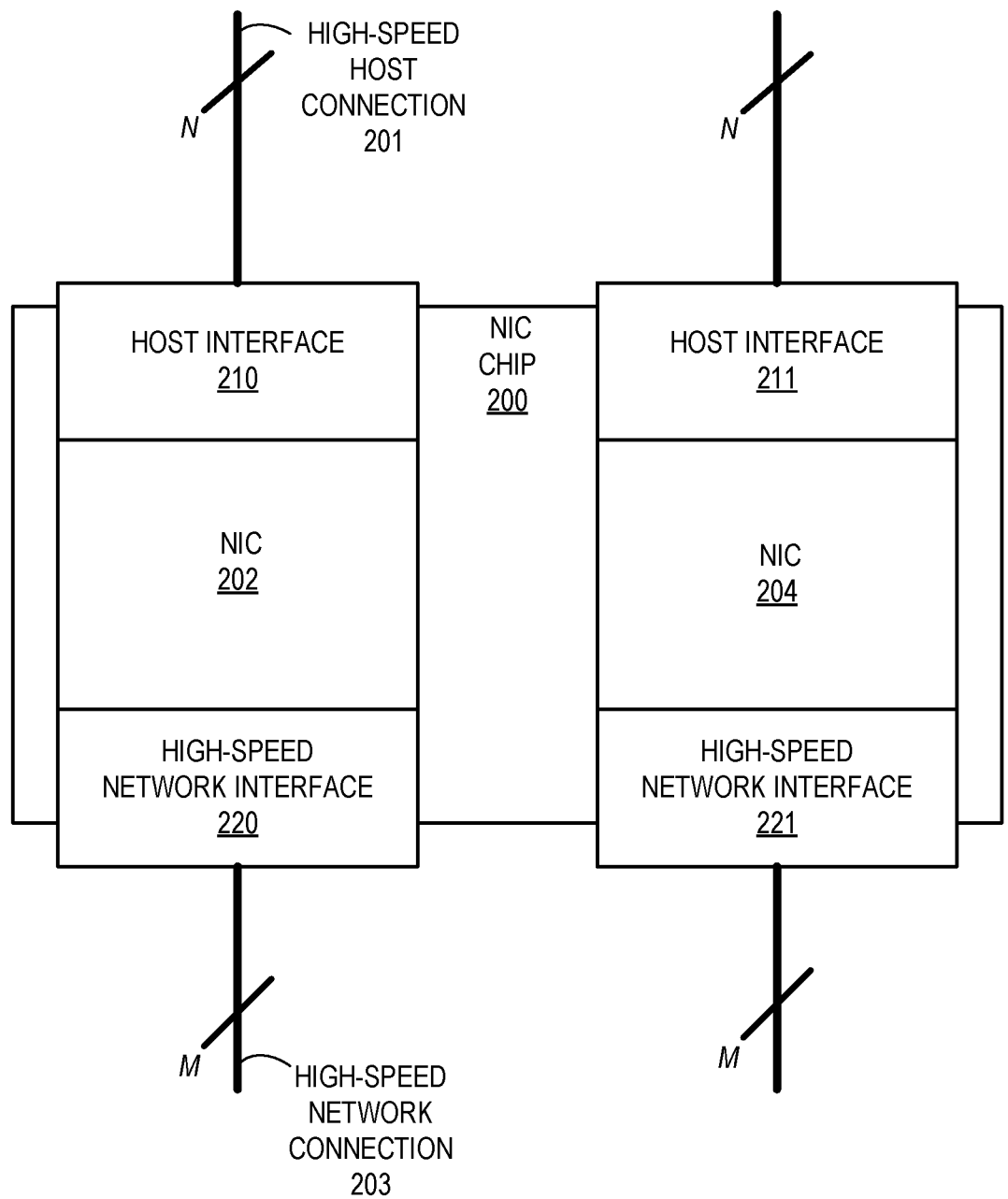
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports efficient management of idempotent operations.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI), a peripheral component interconnect express (PCIe), or a compute express link (CXL) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
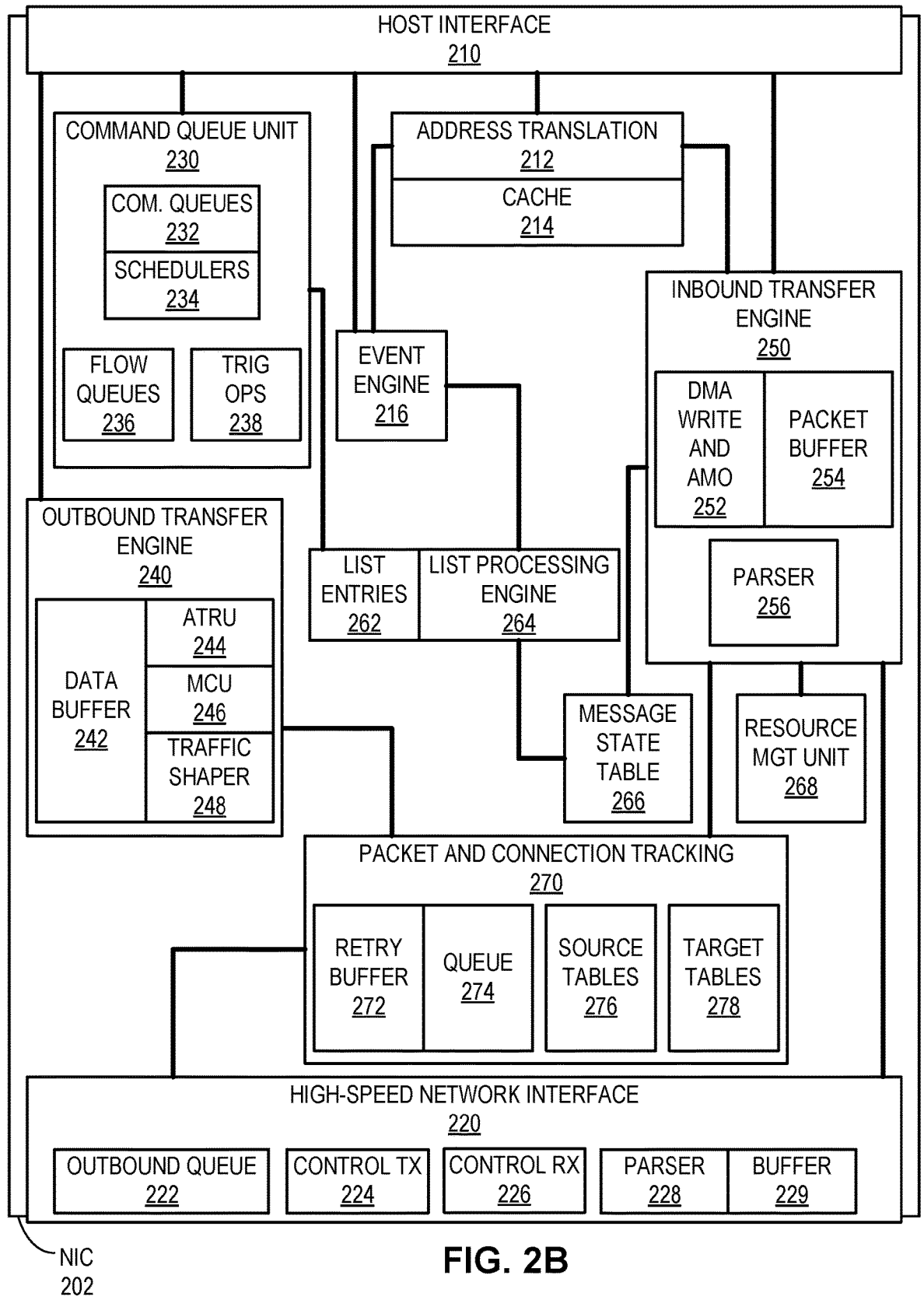
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands. CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Efficient Buffer Utilization in NIC

Figure 3A:
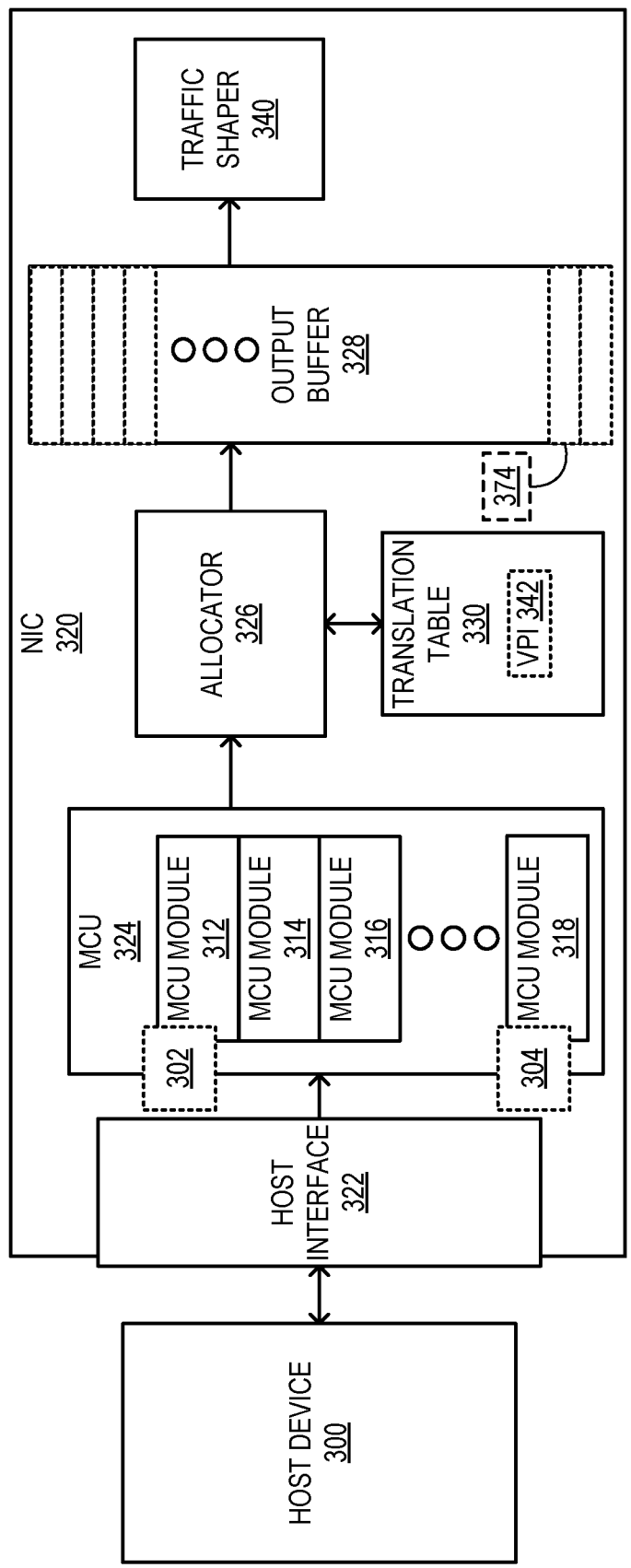
FIG. 3A shows exemplary utilization of an output buffer in a NIC.

FIG. 3A shows exemplary utilization of an output buffer in a NIC. In this example, host device 300 can include a NIC 320. A host interface 322 of NIC 320 may couple NIC 320 with device 300 and facilitate the communication between device 300 and NIC 320. NIC 320 can include an MCU 324, which can include a plurality of MCU modules 312, 314, 416, and 318. The MCU modules in MCU 324 can inject traffic into a shared output buffer 328. Therefore, the MCU modules in MCU 324 can be the injectors for buffer 328. The traffic injected by MCU 324 may belong to different buffer classes. Each buffer class may be associated with one or more MCU modules. On the other hand, an MCU module may be allocated to one buffer class. Consequently, for the same buffer class, multiple MCU modules may inject packets in parallel.

However, the MCU modules in MCU 324 can share a common output buffer 328. To facilitate efficient data access, buffer 328 can support both sequential and random access to the stored data. As a result, an allocator 326 can insert a packet generated by a command into buffer 328 at any available location without requiring it to be contiguous. This allows buffer 328 to store packets while avoiding fragmentation of available capacity in buffer 328. Buffer 328 can be organized as cells, which can be non-contiguous memory locations in a memory device, such as an SRAM module. A respective cell can have a fixed size (e.g., 256 bytes). MCU module 312 may insert a packet 302 into multiple cells of buffer 328. On the other hand, MCU module 318 may insert a packet 304 into a single cell of buffer 328. Typically, the cells of buffer 328 can be organized based on a linked-list so that multi-cell packet 302 can be accessed from buffer 328. However, such an implementation may not provide an efficient way to access buffer 328 at random locations.

To solve this problem, allocator 326 can represent packet 302 based on a VPI 342. Since packet 302 can be stored across multiple cells, VPI 342 can be associated with a set of PCIs. A respective PCI can correspond to a physical cell in buffer 328 that may store a portion of packet 302 (e.g., a packet segment). To access a portion of packet 302, NIC 320 can use VPI 342, which can include a packet handle associated with packet 302 and an offset associated with VPI 342. The packet handle can be represented by the PCI of the head cell (e.g., PCI 364 for packet 302). The offset can indicate a PCI that may store that portion of packet 302. The packet handle can be provided by MCU 312.

When traffic shaper 340 selects MCU 312 for forwarding packet 302, traffic shaper 340 can use the packet handle to determine VPI 342. On the other hand, since packet 304 can fit in a single cell, allocator 326 can use PCI 374 to represent the location of packet 304 in buffer 328. Traffic shaper 340 can use PCI 374 to obtain packet 304 from buffer 328. NIC 320 can maintain a translation table 330 that can store VPI 342 and a set of PCIs associated with VPI 342. To access packet 302 from buffer 328, a traffic shaper 340 can use the PCIs associated with VPI 342 and obtain the portions of packet 302.

Figure 3B:
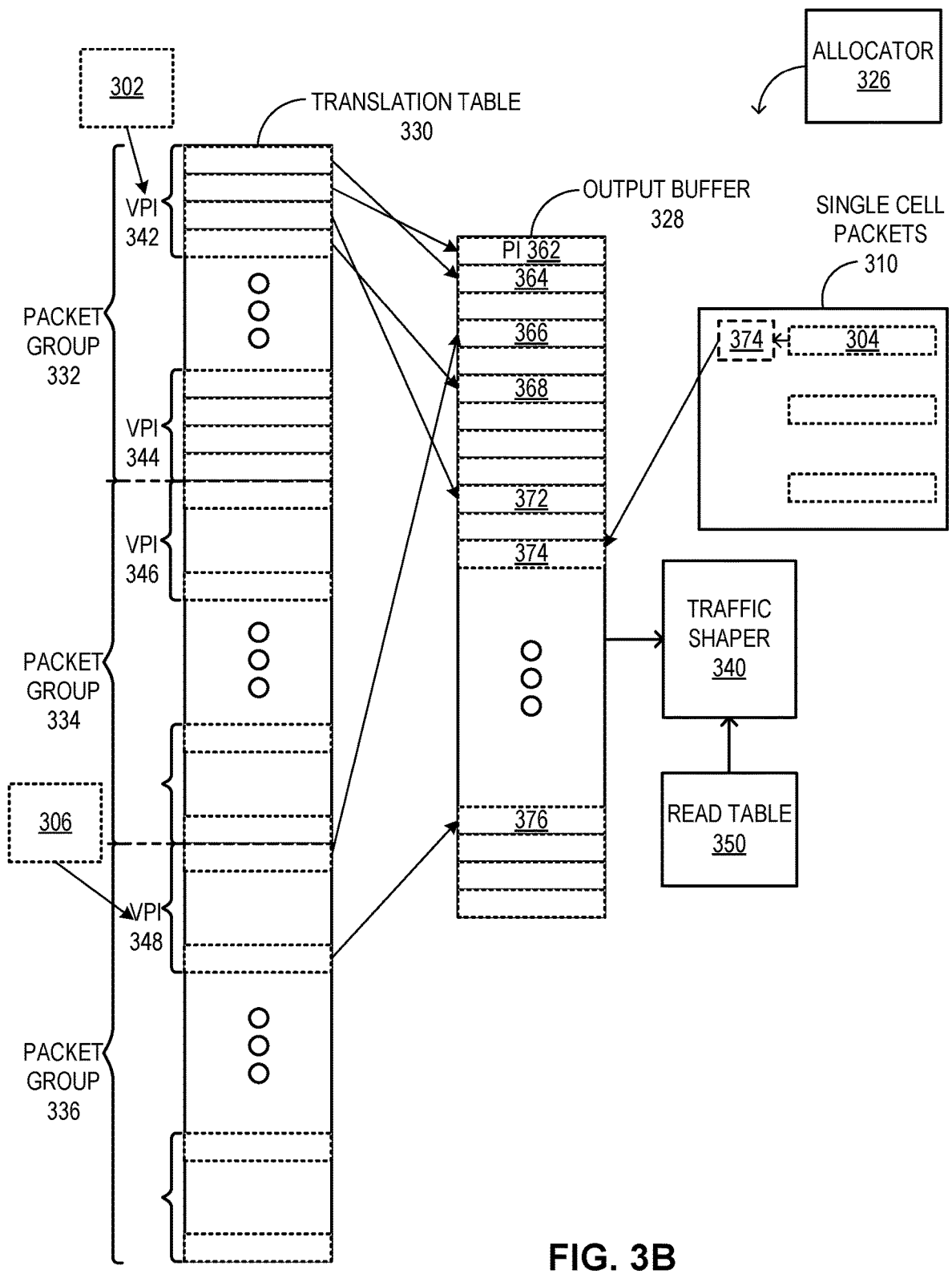
FIG. 3B shows an exemplary allocation process for efficiently utilizing an output buffer in a NIC.

FIG. 3B shows an exemplary allocation process for efficiently utilizing an output buffer in a NIC. Allocator 326 may provide a number of VPIs 342, 344, 346, and 348. Each VPI can indicate an entry in translation table 330. Each entry can include a number of slots, each indicated by an offset. For example, the entry corresponding to VPI 342 can include a number of slots for storing a set of PCIs 364, 362, 368, and 372. Each of these PCIs can identify a cell that can store a portion of packet 302. The entry can store PCIs 364, 362, 368, and 372 in this sequence because the associated cells can store the portions in the corresponding sequence. Cells associated with PCIs 364, 362, 368, and 372 can be non-contiguous. Furthermore, even though PCI 362 may represent a lower index than PCI 364, PCI 362 can store a later portion of packet 302 than PCI 364.

To retrieve packet 302 from buffer 328, traffic shaper 328 can access an entry in a read table 350 to obtain VPI 342. VPI 342 can include the packet handle (i.e., PCI 364) and the offset. Read table 350 can facilitate set of reverse pointers that can be used to allow VPI 342 to be identified by PCI 364 (i.e., the first cell used for packet 302). In some embodiments, the read table entry can be associated with MCU 312. This can allow traffic shaper 340 to retrieve information associated with packet 302 from read table 350 upon selecting MCU 312 for forwarding the next packet. Traffic shaper 340 can use PCI 364 to perform a reverse lookup and identify VPI 342. Traffic shaper 340 can then use VPI 342 to identify the corresponding entry in translation table 330. In some embodiments, the read table may store VPI 342, and traffic shaper 340 can use VPI 342 to perform a lookup and identify PCI 364.

A respective slot in the entry can be retrieved based on the offset associated with VPI 342. For example, if packet 302 is distributed across 4 cells, the slot corresponding to the initial offset (i.e., the zero offset) can include PCI 364 to the first (or head) cell. The first offset can indicate the next slot that can store PCI 362 of the second cell. Similarly, the second and third offsets can indicate the subsequent slots that can store PCIs 368 and 372 of the third and fourth cells, respectively. Hence, to represent packet 302, the entry may need at least four slots.

However, different packets can have different lengths and may require different numbers of cells. As a result, if each entry in translation table 330 can include a number of slots such that the entry can accommodate a packet of a maximum length, some entries in translation table 330 may have unused slots. To reduce the number of pointers in translation table 330, NIC 320 can facilitate a number of packet groups 332, 334, and 336. Each of the packet groups can represent a distinct maximum packet size (e.g., 1 KB, 3 KB, and 10 KB, respectively). Translation table 330 can include a set of entries for each packet group. If the size of a cell is 256 bytes and the length of a packet is 1 KB, each entry of corresponding packet group 332 can include 4 slots. Therefore, the offset value of such an entry can be 4.

Similarly, each entry of packet group 334 can include 12 slots and the corresponding offset value can be 12. Since each entry of the translation table can be represented by a VPI and an offset, the same translation table can have entries with different numbers of slots. Each packet group can have a number of entries in buffer 328. Packet group 332 can have entries associated with VPIs 342 and 344. Similarly, packet group 334 can have an entry associated with VPI 346, and packet group 336 can have an entry associated with VPI 348. When allocating packet 302 to buffer 328, allocator 326 can determine the smallest packet group (i.e., the packet group associated with the smallest packet size) that can accommodate packet 302.

Upon determining that packet 302 can be represented by packet group 332, allocator 326 can assign VPI 342 of packet group 332 to packet 302. On the other hand, upon determining that a packet 306 may need an entry associated with packet group 336, allocator 326 can select VPI 348 for packet 306. Allocator 326 may allocate a number of PCIs, such as PCIs 366 and 376, for VPI 348. Furthermore, allocator 326 can use PCI 374 to represent the location of packet 304 in buffer 328. This mechanism allows allocator 326 to allocate buffer 328, in its entirety, for storing packets because any available cell can be mapped to a VPI for a multi-cell packet or can be allocated to a single-cell packet. This mechanism can minimize fragmentation in the output buffer, and provide both sequential and random access to a respective packet in buffer 328.

Figure 4A:
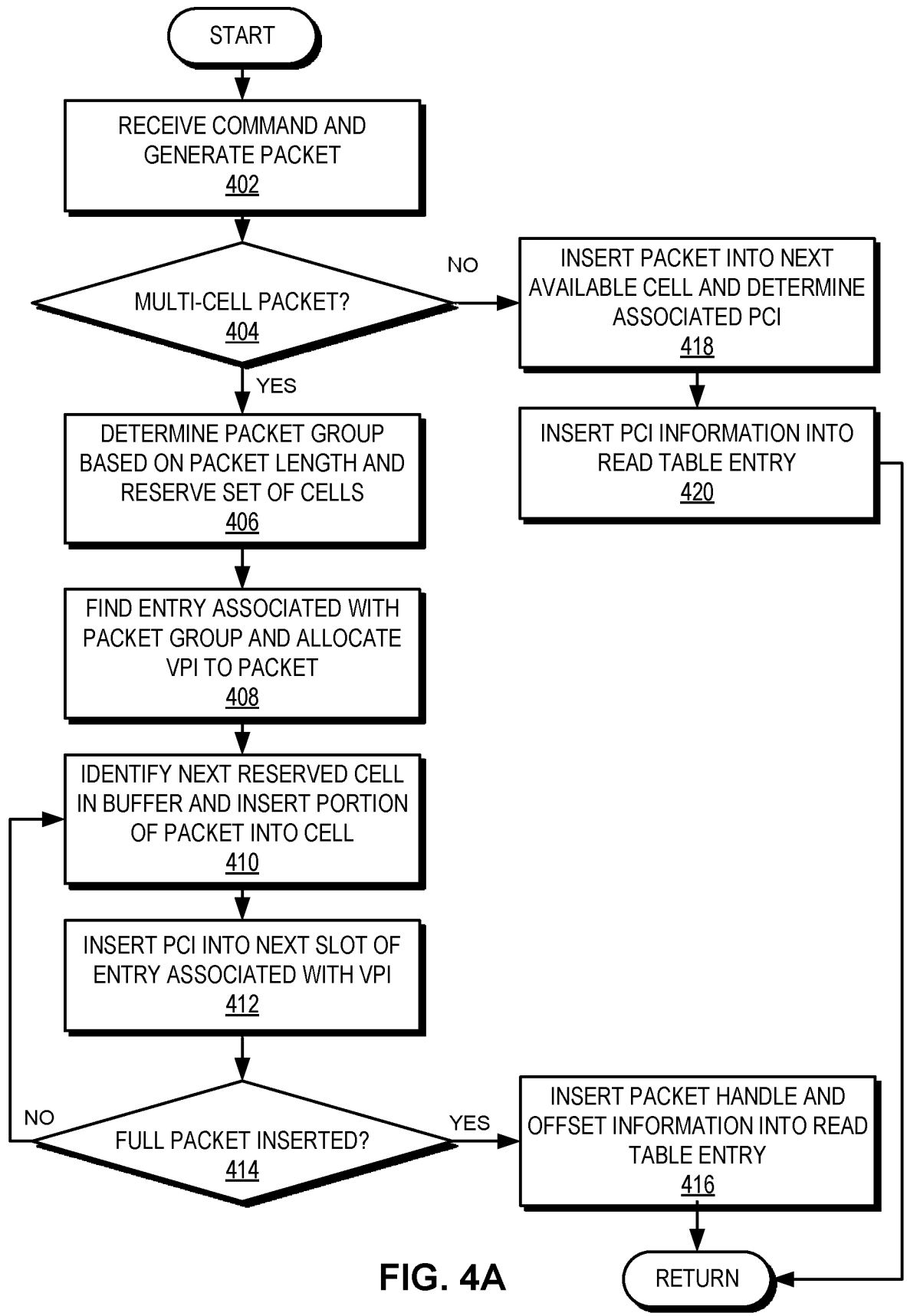
FIG. 4A shows a flow chart of an allocation process for efficiently utilizing an output buffer in a NIC.

FIG. 4A shows a flow chart of an allocation process for efficiently utilizing an output buffer in a NIC. During operation, the NIC can receive a command and generate a packet (operation 402) and check whether the packet is a multi-cell packet (operation 404). If the packet is not a multi-cell packet (i.e., a single-cell packet), the NIC can insert the packet into the next available cell of the input buffer and determine the associated PCI (operation 418). The NIC can then insert the PCI information into the read table (operation 420). On the other hand, if the packet is a multi-cell packet, the NIC can determine a packet group based on the packet length and reserve a set of cells in the output buffer based on the packet length (operation 406).

For example, the NIC may determine the packet group associated with the smallest packet size that can accommodate the packet length. The NIC can then find an entry associated with the packet and allocate the corresponding VPI to the packet (operation 408). The slots of the entry associated with the VPI can then store the PCIs of the reserved cells. Subsequently, the NIC can identify the next reserved cell in the output buffer and insert a portion of the packet into the cell (operation 410). If the size of the cell is 256 bytes and the size of the packet is 1 KB, the NIC may insert the first 256 bytes of the packet into the cell. The NIC can insert the PCI of the cell into the next slot of the entry associated with the VPI (operation 412). For the initial insertion, the next slot can be the first slot of the entry and the corresponding PCI can point to the head cell.

The NIC can then check whether the full packet has been inserted (operation 414). If the full packet has not been inserted, the NIC can continue to identify the next reserved cell in the output buffer and insert the next portion of the packet into the cell (operation 410). On the other hand, if the full packet has been inserted, the NIC can insert the packet handle and the offset information into a read table entry (operation 416). In some embodiments, the read table entry can be associated with the MCU of the packet. This can allow the traffic shaper of the NIC to retrieve the packet information from the read table upon selecting the MCU for forwarding the next packet. In some embodiments, the NIC may determine the PCI of each cell that is required and store the PCI in a corresponding slot of the entry associated with the VPI during the allocation time.

Figure 4B:
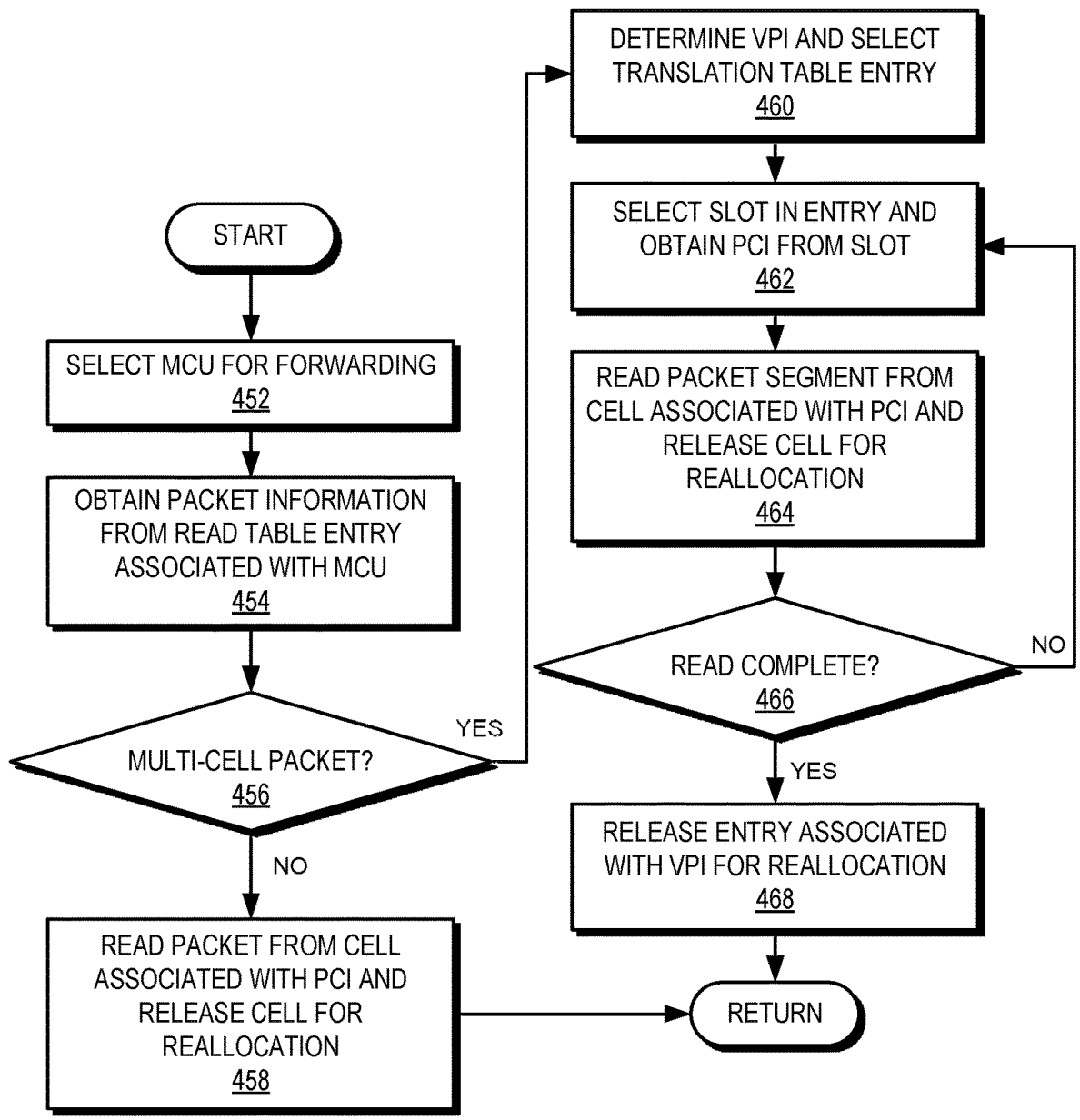
FIG. 4B shows a flow chart of a retrieval process of a multi-cell packet from an output buffer in a NIC.

FIG. 4B shows a flow chart of a retrieval process of a multi-cell packet from an output buffer in a NIC. During operation, the NIC can select an MCU for forwarding (operation 452), and obtain the packet information from a read table entry associated with the MCU (operation 454). The NIC can then determine whether the packet is a multi-cell packet (operation 456). If the packet is not a multi-cell packet, the packet information can include a PCI of the cell storing the packet. Accordingly, the NIC can read the packet from the cell associated with the PCI and release the cell for reallocation (operation 458).

On the other hand, if the packet is a multi-cell packet, the packet information can include the packet handle and offset. The NIC can then determine the VPI from the packet handle and select the corresponding translation table entry (operation 460). The NIC can then select a slot in the entry and obtain a PCI from the slot (operation 462). Subsequently, the NIC can read the packet segment from the cell associated with the PCI and release the cell for reallocation (operation 464). The NIC can then check whether the read operation is complete (operation 466). If the read is not complete, the NIC can continue to select the next slot in the entry and obtain a PCI from the slot (operation 462). If the read is complete, the NIC can release the entry associated with the VPI for reallocation (operation 468).

Exemplary Computer System

Figure 5:
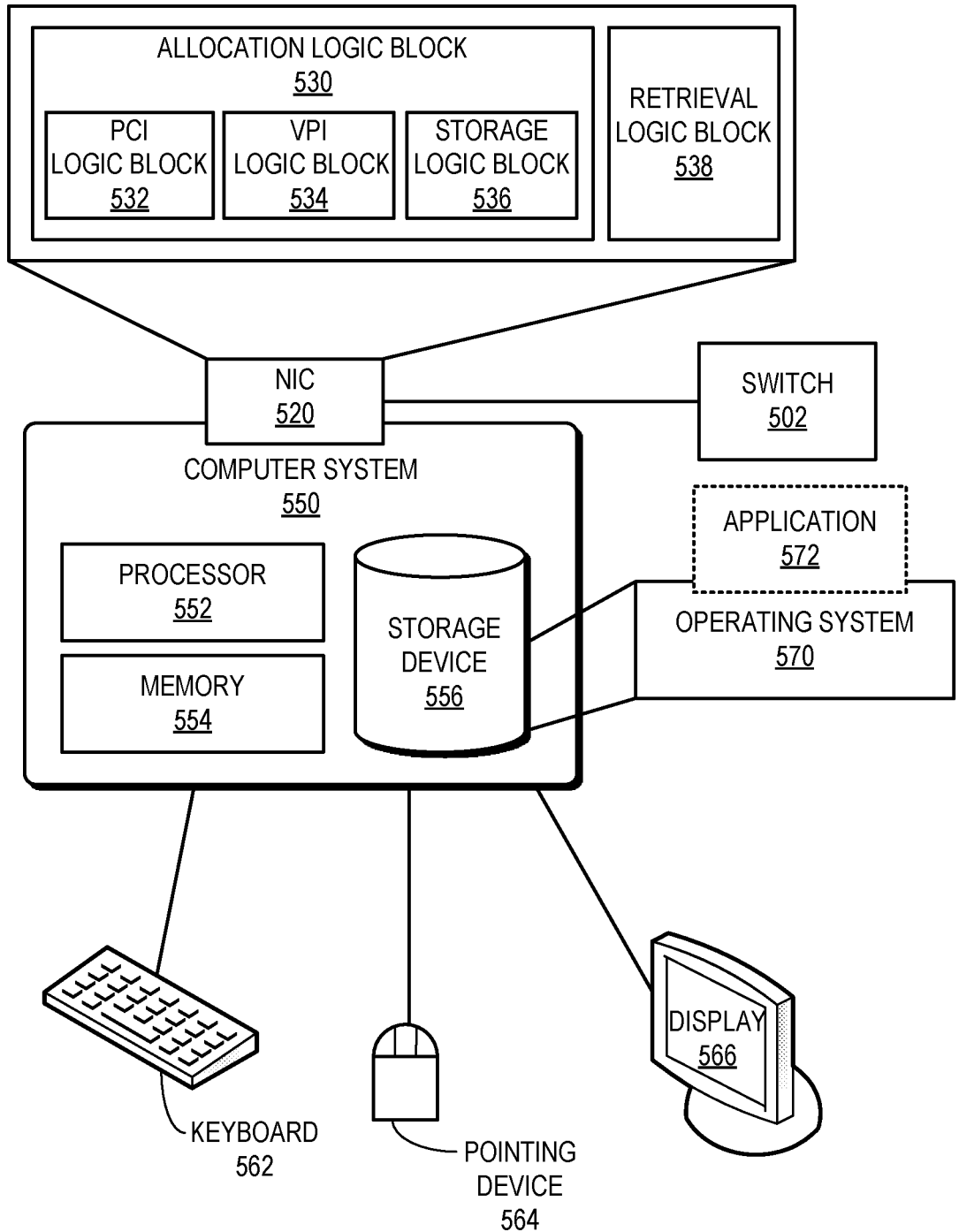
FIG. 5 shows an exemplary computer system equipped with a NIC that facilitates efficient utilization of an output buffer.

FIG. 5 shows an exemplary computer system equipped with a NIC that facilitates efficient packet forwarding. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient data request management. NIC 520 can provide one or more HNIs to computer system 550. NIC 520 can be coupled to a switch 502 via one of the HNIs. NIC 520 can include an allocation logic block 530, as described in conjunction with FIGS. 3A and 3B. Allocation logic block 530 can include a PCI logic block 532, a VPI logic block 534, and a storage logic block 536.

PCI logic block 532 can determine whether a packet is a multi-cell packet, and allocate a PCI to a single-cell packet. VPI logic block 534 can manage multi-cell packets in NIC 520. For example, VPI logic block 534 can select a packet group, allocate an entry in a translation table, and allocate cells for a multi-cell packet. Storage block 536 can manage the insertion of a packet into an output buffer of NIC 520, as described in conjunction with FIG. 3B. NIC 520 can also include a retrieval logic block 538 (e.g., the traffic shaper of NIC 520) that can retrieve a packet based on a read table and the translation table, as described in conjunction with FIG. 4B.

In summary, the present disclosure describes a NIC that facilitates efficient utilization of an output buffer. The NIC can be equipped with an output buffer, a host interface, an injector logic block, and an allocation logic block. The output buffer can include a plurality of cells, each of which can be a unit of storage in the output buffer. If the host interface receives a command from a host device, the injector logic block can generate a packet based on the command. The allocation logic block can then determine whether the packet is a multi-cell packet. If the packet is a multi-cell packet, the allocation logic block can determine a virtual index for the packet. The allocation logic block can then store, in an entry in a data structure, the virtual index and a set of physical indices of cells storing the packet.

The methods and processes described above can be performed by hardware logic blocks, modules, logic blocks, or apparatus. The hardware logic blocks, modules, logic blocks, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A network interface controller (NIC), comprising:
an output buffer comprising a plurality of cells, wherein a respective cell is a unit of storage in the output buffer;
a host interface to receive a command from a host device;
an injector logic block to generate a packet based on the command; and
an allocation logic block to:
determine whether the packet is a multi-cell packet;
in response to determining that the packet is a multi-cell packet, wherein a first data structure comprises entries for a plurality of packet groups, wherein each packet group corresponds to a distinct maximum packet size of a plurality of maximum packet sizes;
determine, for the packet based on a size of the packet, a packet group which corresponds to a smallest of the maximum packet sizes that can accommodate the packet;
allocate, based on an entry in the first data structure for the determined packet group, a virtual index for the packet;
reserve, for the packet based on the size of the packet, a set of cells in the output buffer;
store, in the entry in the first data structure for the determined packet group: the virtual index for the packet; and a set of physical indices of the reserved cells, wherein the physical indices are stored in slots of the entry;
insert the packet into the reserved cells of the output buffer; and
responsive to inserting the packet into the reserved cells of the output buffer, store, in a second data structure: a packet handle associated with the packet; offset information associated with the virtual index; and an identifier of a message-fragmenting unit selected for forwarding the packet.

2. The network interface controller of claim 1, wherein the entry is identified by the virtual index, wherein the entry comprises a set of slots, and wherein a respective slot is to store a physical index of the set of physical indices.

3. The network interface controller of claim 1, wherein the injector logic block is further to:
store a portion of the packet in a cell identified by a physical index of the set of physical indices.

4. The network interface controller of claim 1, wherein the reserved cells storing the packet are non-contiguous in the output buffer.

5. The network interface controller of claim 1, further comprising a retrieval logic block to:
determine the packet handle and an offset associated with the packet;
identify the entry based on the packet handle; and
obtain the set of physical indices from the entry.

6. The network interface controller of claim 5, wherein the retrieval logic block is further to obtain a packet segment from a respective cell associated with a physical index of the set of physical indices.

7. The network interface controller of claim 6, wherein the allocation logic block is further to release the entry for reallocation.

8. The network interface controller of claim 1, wherein, in response to determining that the packet is a single-cell packet, the allocation logic block is further to determine a physical index of a cell for the packet; and
wherein the injector logic block is further to store the packet in a cell identified by the physical index.

9. The network interface controller of claim 1, wherein the message-fragmenting unit is to:
fragment a single message into packets of sizes corresponding to a maximum transmission unit; and
obtain a next command from an assigned flow queue.

10. The network interface controller of claim 1, wherein storing the identifier of the message-fragmenting unit in the second data structure causes a traffic shaper of the network interface controller to, in response to the message-fragmenting unit being selected for forwarding a next packet, retrieve information associated with the packet from the second data structure.

11. A method, comprising:
maintaining, in a network interface controller (NIC), an output buffer comprising a plurality of cells, wherein a respective cell is a unit of storage in the output buffer;
receiving, via a host interface, a command from a host device; generating a packet based on the command;
determining whether the packet is a multi-cell packet;
in response to determining that the packet is a multi-cell packet, wherein a first data structure comprises entries for a plurality of packet groups, wherein each packet group corresponds to a distinct maximum packet size of a plurality of maximum packet sizes:
determining, for the packet based on a size of the packet, a packet group which corresponds to a smallest of the maximum packet sizes that can accommodate the packet;
allocating, based on an entry in the first data structure for the determined packet group, a virtual index for the packet;

reserving, for the packet based on the size of the packet, a set of cells in the output buffer;

storing, in the entry in the first data structure for the determined packet group: the virtual index for the packet; and a set of physical indices of the reserved cells, wherein the physical indices are stored in slots of the entry;

inserting the packet into the reserved cells of the output buffer; and responsive to inserting the packet into the reserved cells of the output buffer, storing, in a second data structure: a packet handle associated with the packet; offset information associated with the virtual index; and an identifier of a message-fragmenting unit selected for forwarding the packet.

12. The method of claim 11, wherein the entry is identified by the virtual index, wherein the entry comprises a set of slots, and wherein a respective slot is to store a physical index of the set of physical indices.

13. The method of claim 11, further comprising:

storing a portion of the packet in a cell identified by a physical index of the set of physical indices.

14. The method of claim 11, wherein the reserved cells storing the packet are non-contiguous in the output buffer.

15. The method of claim 11, further comprising:

determining the packet handle and an offset associated with the packet;

identifying the entry based on the packet handle; and obtaining the set of physical indices from the entry.

16. The method of claim 15, further comprising obtaining a packet segment from a respective cell associated with a physical index of the set of physical indices.

17. The method of claim 16, further comprising releasing the entry for reallocation.

18. The method of claim 11, wherein in response to determining that the packet is a single-cell packet, the method further comprises:

determining a physical index of a cell for the packet; and storing the packet in a cell identified by the physical index.

19. The method of claim 11, further comprising:

fragmenting, a single message into packets of sizes corresponding to a maximum transmission unit; and obtaining a next command from an assigned flow queue.

20. The method of claim 11, wherein subsequent to storing the identifier of the message-fragmenting unit in the second data structure and in response to the message-fragmenting unit being selected for forwarding a next packet, the method further comprises retrieving information associated with the packet from the second data structure.

* * * * *